United States Patent [19]

Kim

[11] Patent Number: 5,113,838
[45] Date of Patent: * May 19, 1992

[54] AIR FLOW SYSTEM FOR AN INTERNAL COMBUSTION ENGINE

[76] Inventor: Sei Y. Kim, 221-9 Bongchun 7-Dong, Kwanak-Ku, Seoul, Rep. of Korea

[*] Notice: The portion of the term of this patent subsequent to Oct. 16, 2007 has been disclaimed.

[21] Appl. No.: 683,037

[22] Filed: Apr. 10, 1991

[30] Foreign Application Priority Data

Jun. 12, 1990 [FR] France .................................. 90-8216

[51] Int. Cl.$^5$ ............................................ F02M 29/02
[52] U.S. Cl. .................................... 123/592; 123/590; 123/593
[58] Field of Search ................... 123/592, 590; 60/902

[56] References Cited

U.S. PATENT DOCUMENTS

| | | | |
|---|---|---|---|
| 2,017,043 | 10/1935 | Galliot | 123/590 |
| 3,269,110 | 8/1966 | Caddell | 60/902 |
| 3,376,695 | 4/1968 | Muckley | 60/902 |
| 3,544,290 | 12/1970 | Larson | 123/592 |
| 3,648,674 | 3/1972 | Proctor | 123/593 |
| 3,877,909 | 4/1975 | Elliff | 123/590 |
| 4,274,386 | 1/1981 | Reyes | 123/591 |
| 4,309,969 | 1/1982 | Mathes | 123/188 |
| 4,367,700 | 1/1983 | Pace | 123/592 |
| 4,424,777 | 1/1984 | Klomp | 123/188 |
| 4,432,312 | 2/1984 | Klomp et al. | 123/188 |
| 4,478,607 | 10/1984 | Capps | 123/592 |
| 4,539,954 | 9/1985 | Klomp | 123/188 |
| 4,729,776 | 3/1988 | Elliff | 123/592 |
| 4,962,642 | 10/1990 | Kim | 123/590 |

FOREIGN PATENT DOCUMENTS

| | | | |
|---|---|---|---|
| 58-13122 | 1/1983 | Japan . | |
| 59-11722 | 3/1984 | Japan . | |
| 60-17922 | 5/1985 | Japan . | |
| 61-10645 | 3/1986 | Japan . | |
| 766183 | 1/1957 | United Kingdom | 123/592 |

Primary Examiner—E. Rollins Cross
Assistant Examiner—Erick Solis
Attorney, Agent, or Firm—Birch, Stewart, Kolasch & Birch

[57] ABSTRACT

An air flow system for an internal combustion engine comprising an air cleaner and a swirling device disposed therein and having a plurality of vanes with at least one elongated slit for causing the air to swirl thereby improving the properties of the air fuel mixture and improving the performance of the engine.

14 Claims, 1 Drawing Sheet

AIR FLOW SYSTEM FOR AN INTERNAL COMBUSTION ENGINE

BACKGROUND OF THE INVENTION

1. Field of the Invention

The present invention relates to an air flow system for an internal combustion engine and more particularly, to an air swirling device having a plurality of vanes with at least one elongated slit disposed therein, respectively, which is positioned within an air cleaner of an internal combustion engine for achieving complete combustion. The air flow system is used for a spark ignition internal combustion of a carburetor type or a fuel injection type, and a diesel engine of a high compression self-ignition type.

2. Description of the Prior Art

It is known that an increase of swirl flow in a combustion chamber of an internal combustion engine improves the flame propagation speed so that complete combustion is achieved. However, there are many problems which accompany attempts at increasing air flow such as air resistance and the like. Such known facts are shown in the following prior art documents. For example, Japanese patent publication No. 59-11722 and U.S. Pat. No. 4,309,969 disclose a simple turbulence device, which includes an intake valve having a large intake resistance so that the swirling device does not create an uniform air flow. Japanese patent publication Nos. 60-17922 and 61-10645, U.S. Pat. Nos. 4,424,777, 4,432,312, and 4,539,954 disclose a device having vanes which are disposed at the vicinity of an intake valve. Such devices have various disadvantages, such as for example, air resistance, reduced inlet air into the cylinder, varying air flows of intake manifolds and strong vibrations due to different swirl ratios and volumes of intake air. U.S. Pat. Nos. 3,648,674 and 4,274,386 disclose a wire set and blades device disposed between a carburetor and a intake manifold. However, the device exhibits high friction so that the device provides a reduced amount of inlet air and is used only for a gasoline engine of the carburetor type.

In order to avoid such problems, U.S. Pat. No. 4,962,642, issued to the present inventor, discloses an air flow system for an internal combustion engine comprising an air cleaner and a swirling device disposed therein, having a plurality of vanes for causing the air to swirl thereby improving the properties of air fuel mixture and the performance of the engine. However, this air flow system, generally, has negative pressure disposed behind the plurality of vanes and air flow frictions due to the swirl of the air so that the air flow system has several disadvantages such as, for example, decrease of the intake air, lower power, and no fuel save.

SUMMARY OF THE INVENTION

Accordingly, it is an object of the present invention to provide an improved air flow system for an internal combustion engine.

Another object of the present invention is to provide an air swirling device located in an air cleaner, the air swirling device having a plurality of slitted vanes with at least one elongated slit disposed therein, respectively.

One advantage of the air swirling device of the present invention is that it minimizes the restriction of air flow and causes the fuel to stay in the center part of the swirl of air and prevents adherence of the fuel to the wall of the intake system and from generating negative pressure behind the vanes. This provides for a good mixture of air and fuel having good evaporation and fine and uniform fuel particle size which improves the acceleration of the vehicle driven by the engine. If there is a slight pedal acceleration, the amount of the injected fuel is lower thereby resulting in fuel savings.

During operation, the air intake valve continuously opens and closes. When the valve is closed a revolution inertia force causes a high density of air which surge into the combustion chamber when the valve opens. During combustion, the flame is scattered and the fuel is completely combusted thereby producing a uniform force downwardly on the piston. The uniform force prevents noise vibration and abrasion thereby causing stronger engine power and longer engine life. The fast combustion is useful with advanced spark timing and results in leaner combustion, lower air pollution and fuel savings. The combustion products (carbon and oxides) are concentrated in the center of the combustion chamber and can be easily exhausted to prevent carbon accumulation in the combustion chamber which could cause engine abrasion. The swirling action may continue in the same direction without any intake resistance as the gas leaves the combustion chamber. When the swirling device having the plurality of vanes with at least one elongated slit disposed therein, respectively, is placed in the air cleaner, the carbon monoxide (CO) gas level can be reduced up to 17% at engine idle speed. The engine power can be increased up to 11%. Fuel economy can be improved up to 6% and $NO_x$ can be reduced up to 5. These data were calculated and measured by the Korea National Industry Research Institute.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an air flow system for an internal combustion engine comprising an air cleaner and a swirling device having a plurality of slitted vanes with at least one elongated slit disposed therein, respectively, which are disposed around the center of the air cleaner for causing the air to swirl. The air cleaner preferably has a cylindrical shape and the swirling device has a control outwardly from the control area toward the air cleaner. The vanes of the swirling device, having at least one elongated slit disposed therein, respectively, for increasing air flow through the air cleaner to reduce the air resistance.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
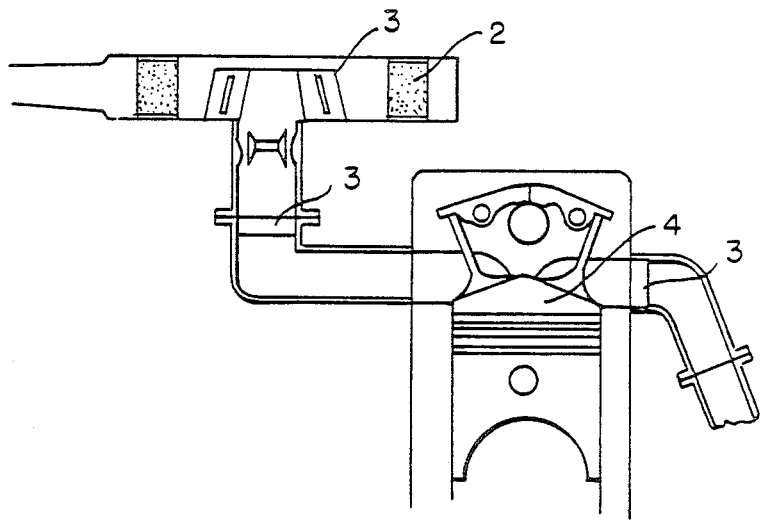
FIG. 1 is a cross-sectional view of the air flow system for a gasoline engine of an internal combustion engine of the present invention.

Referring now in detail to the drawings for the purpose of illustrating preferred embodiments of the present invention, the air flow system as shown in FIGS. 1 and 2, comprises an air cleaner 2 and a swirling device 3 having a plurality of vanes 3' with at least one elongated slits 1 disposed therein, respectively, which is disposed around the center of the air cleaner 2 for causing the air to swirl. The swirling device 3 may be made of flexible materials.

The air cleaner 2 is associated with an engine body of a gasoline engine through a carburetor 4 and an intake manifold (FIG. 1). The engine body is associated with an exhaust manifold. The swirling device 3 is inserted into the inside of the air cleaner 2 by a bolt and a wing nut (not shown).

Figure 4:
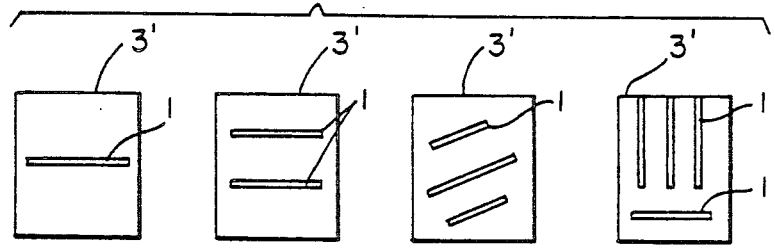
FIG. 4 is a front view of vanes of the swirling device of the present invention, having at least one elongated slit disposed therein for insertion between a carburetor and an intake manifold.

As shown in FIG. 4, each of vanes has at least one elongated slit. The slit 1 numbers 1 to 4 and also, the slit 1 is vertically or horizontally located in the vanes and vertically and horizontally located in the vanes.

In operation, when pistons and intake valves move downward, air flow filtered by the air cleaner 2 is swirled by the vanes 3' of the swirling device 3, respectively, due to a reduced pressure in a combustion chamber. At this time, in the carburetor (4) of the gasoline engine, fuel particles are gathered in the center of the swirling air flow for causing fuel and air to uniformly mix. And the swirling air flow center moves very fast so that the fuel does not adhere to the wall of the intake conduit and results in good engine and accelerator pedal response. Also, the swirling air flow is continuously maintained in the combustion chamber so that the swirling air flow is continuously maintained in the exhaust manifold. Therefore, in the combustion chamber, the flame is scattered very well and the fuel is completely combusted for preventing noise, vibration and abrasion thereby causing longer engine life and stronger engine power.

Figure 2A:
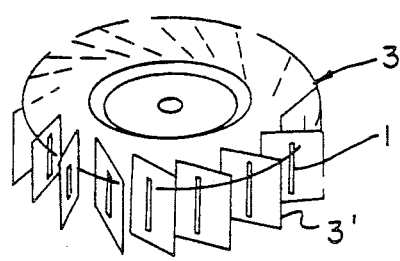
FIG. 2(A) a perspective view of an air cleaner containing a swirling device having a plurality of vanes with at least one slit disposed therein, respectively, of the present invention.
Figure 2B:
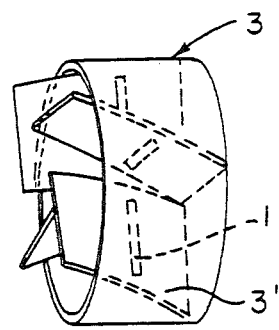
FIG. 2(B) is a perspective view of an additional air cleaner containing a swirling device having a plurality of vanes with at least one slit disposed therein, respectively, of the present invention.

As shown in FIGS. 2(A) and 2(B), the swirling devices 3 having a plurality of vanes 3', respectively, can be added in the portion between the carburetor 4 and intake manifold in the same direction for increasing the swirling air flow force which may be reduced while the swirling air passes the carburetor 4.

As shown in FIG. 1, an additional swirling device 3 is inserted into the exhaust manifold entrance in the same direction for improving the swirling of the exhaust gas. Furthermore, the swirling exhaust gas prevents backpressure thereby resulting in complete exhaustion and stronger intake force.

Figure 3A:
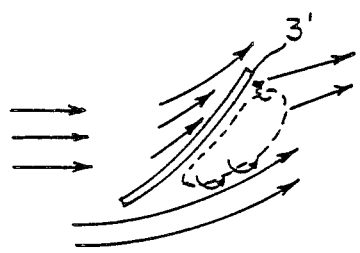
FIG. 3(A) shows the air flow stream through the conventional air flow system.
Figure 3B:
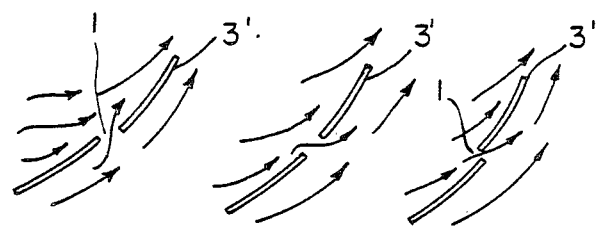
FIG. 3(B) shows the air flow stream through the air flow system of the present invention.

As shown in FIGS. 3(A) and 3(B), the air flow stream according to the present invention prevents from generating the negative pressure disposed behind the plurality of vanes 3' (FIG. 3(B)). However the air flow stream according to the conventional air flow system generate the negative pressure disposed behind the plurality of vanes (FIG. 3(A)).

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An air flow system for an internal combustion engine, which comprises:
   a cylindrical air cleaner, said cylindrical air cleaner divided into a centrally disposed air swirling zone and a laterally disposed filter zone, and
   a swirling device disposed in said air swirling zone, said swirling device including:
   a centrally disposed hub member,
   a plurality of flexible vane members which extend radially from said hub member toward the filter zone for increasing air flow, and
   at least one elongated slit disposed in each of said plurality of vane members, respectively, so as to prevent the generation of negative pressure behind the vane members, whereby when air is introduced through said filter zone and into said air swirling zone, a strong swirling force is generated which is retained by the reduced resistance caused by the air flow of the vane members.

2. The air flow system of claim 1, wherein one elongated slit is disposed on each of said vane members.

3. The air flow system of claim 2, wherein two elongated slits are disposed in each of vane members.

4. The air flow system of claim 2, wherein three elongated slits are disposed in each of vane members.

5. The air flow system of claim 2, wherein four elongated slits are disposed in each of vane members.

6. The air flow system of claim 1, further comprising a second swirling device near the intake manifold entrance to provide an air swirl in the same direction as said first air swirling device.

7. The air flow system of claim further comprising a second swirling device near the exhaust manifold entrance to provide an air swirl in the same direction as said first air swirling device.

8. The air flow system of claim 1, wherein said engine is a gasoline or diesel engine.

9. The air flow system of claim 1, wherein said swirling device includes a central portion spaced from an opening in the bottom of said air cleaner and said vane members extend from said central portion toward said bottom of said air cleaner whereby said swirling device surrounds said opening in the bottom of said air cleaner.

10. The air flow system of claim 1, wherein said swirling device includes the plurality of vane members having at least one horizontally elongated slit.

11. The air flow system of claim 1, wherein said swirling device includes the plurality of vane members having at least one vertically elongated slit.

12. The air flow system of claim 1, wherein said swirling device includes the plurality of vane members having at least one horizontally elongated slit and one vertically elongated slit.

13. The air flow device of claim 9, wherein said vane members are disposed inside of said air cleaner element.

14. The air flow device of claim 5, wherein said swirling device is formed from a single piece of metal.

* * * * *